Sept. 23, 1952     R. E. DAVIES ET AL     2,611,574
RESILIENT MOUNTING
Filed Jan. 17, 1948
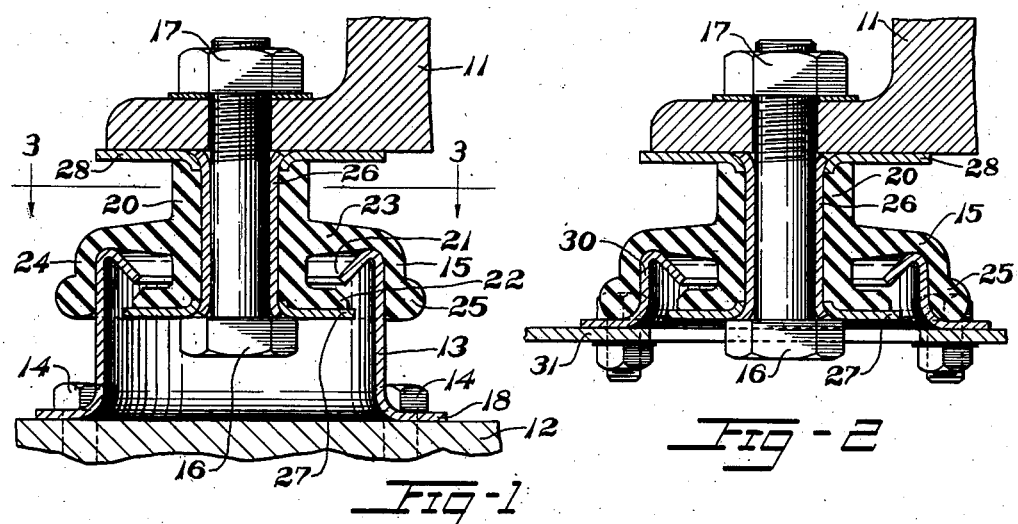
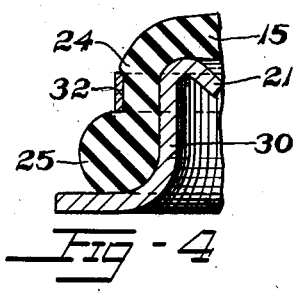
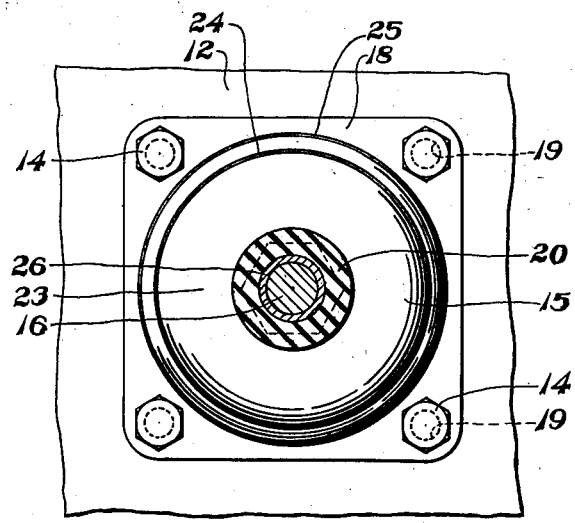
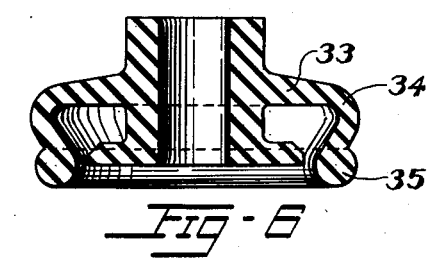
Inventor
Robert E. Davies
Herbert H. Fink
By
Atty Patented Sept. 23, 1952

2,611,574

UNITED STATES PATENT OFFICE 2,611,574

RESILIENT MOUNTING

Robert E. Davies and Herbert H. Fink, Akron, Ohio, assignors to The B. F. Goodrich Company, New York, N. Y., a corporation of New York Application January 17, 1948, Serial No. 2,884

6 Claims. (Cl. 248—358)

This invention relates to resilient mountings for cushioning vibrations and decreasing noise and is especially suited for insulating instruments from harmful forces and vibrations.

In mountings of this type it is desirable that the movement of the supported body relative to the supporting body be limited in extent and that the mounting have an interlocking arrangement providing a secure connection to prevent undesired separation between the supported body and the supporting body. At the same time it is desirable that the mounting be easily assembled without vulcanization or intricate clamping operations and that the cushioning body be mounted in the mounting in a manner such that in operation the stresses from flexing will be distributed effectively in the cushioning body and the stresses from attachment will not be unduly concentrated.

It is an object of this invention to provide an improved resilient mounting incorporating the desirable features hereinabove mentioned. Other objects are to provide for limiting the amount of deflection of the mounting, to provide for utilizing the elastic properties of the cushioning body in the attachment to the supported and supporting bodies, to provide a determinate span of stressed material of the cushioning body, to provide for securing a rubber cushioning body without requiring a vulcanized bond for the attachment, to provide for effective distribution of stresses in the cushioning body, to provide simplicity of construction, ease of installation and effectiveness in operation.

These and other objects will be apparent from the following description, reference being had to the accompanying drawings in which:

Fig. 1 is a sectional elevation of a mounting constructed in accordance with and embodying the invention, parts being broken away.

Fig. 2 is a sectional elevation of a modified construction, parts being broken away.

Fig. 3 is a section taken along line 3—3 of Fig. 1.

Fig. 4 is a detailed section of another modification, parts being broken away.

Fig. 5 is a detailed section of a further modification, parts being broken away.

Fig. 6 is a sectional elevation of the resilient cushioning body of a still further modification.

Referring to Fig. 1 the mounting of the invention is shown disposed between a supported structure such as a bracket 11 of an instrument panel and a supporting plate or other structure 12. A base member 13 of the mounting is secured to the supporting structure 12 by fasteners such as bolts 14, 14 and supports a spring unit or cushioning body 15 of resilient rubber-like material which in turn is secured to the bracket 11 through a bolt and nut 16 and 17. The base member 13 is preferably cylindrical in shape with an outwardly extending base flange 18, which has apertures 19, 19 for receiving the fastening bolts 14, 14. The other margin of the base member is rolled or otherwise inwardly bent providing an inner flange 21 with a smooth rounded edge seat surface of small radius of curvature for supporting the cushioning body 15. The inner flange 21 is bent inwardly and obliquely toward a lateral extension such as annular flange portion 22 of the cushioning body 15 which it overlies and limits upward movement of the bracket 11 relative to the section 12 as shown in Fig. 1 upon engagement of the inner flange with the flange portion of the cushioning body.

The cushioning body 15 is preferably circular as shown in Fig. 3 and has an inner boss element such as tubular portion 20 and a span portion 23 extending radially outward from said tubular portion to the rounded inner flange of the base member 13 and then extending axially to overlap and encompass the base member with an outer portion 24 providing a supporting connection between the base member and the cushioning body. Integral with the tubular portion and extending outwardly toward but terminating short of the walls of the base member is the flange portion 22. The inner diameter of the outer portion 24 of the cushioning body 15 and the outer diameter of the base member 13 may be the same or approximately so and provide an effective supporting connection, the outer portion of the cushioning body being urged radially inward under load on the mounting in gripping engagemet with the abutting faces of the base member. The outer portion 24 may be provided with a beaded lip 25 as shown in Fig. 1 to increase the thickness of the material at the outer edge and provide greater resistance to stretching of the outer portion when under load in order that the maximum gripping action may be had between the outer portion and the base member.

The inner tubular portion 20 of the cushioning body 15 has a cylindrical opening for receiving an inner member 26 of metal tubing and may have a smaller diameter than the outside diameter of the inner member before assembling to provide improved gripping engagement with the inner member upon assembly because of the initial stretching in assembly. The inner member 26 may be flanged at the end or have discs 27 and 28 which may be metal washers disposed at and covering the end portion of the cushioning body as shown in Fig. 1. The discs 27 and 28 may be secured to the metal tubing in any suitable manner such as by bending the edges of the tube outward urging the abutting edges of the discs against the material of the cushioning body or may simply be held in abutting relationship by the nut and bolt 16 and 17. One disc 27 backs the flange portion 22 of the cushioning body and in cooperation with the flange 21 limits the upward deflection of the mounting and supported structure. The other disc 28 extends radially beyond the cylindrical cushioning body 15 and overlies the inner flange portion 21 of the base member 13 providing a bumper for limiting the downward movement of the bracket 11. The cushioning body may be full molded as an independent unit and later assembled with the other parts.

In operation, the cushioning span 23 of the cushioning body 15 carries the normal weight of the supported structure and is stressed in tension and in shear thereby. Vertical movements of the supported structure relative to the supporting structure likewise are cushioned by shear and tension of the cushioning flange 23, providing a soft springing action. Lateral movements are resisted in the direction of the span in which direction the mounting is less flexible than it is in the vertical direction. Excessive vertical movement of the supported structure relative to the supporting structure is limited by disc 28 overlying the cushioning flange 23 and metal base member 15 and by the inner flange 21 of the base member overlying the cushioning flange 22 and the disc 27, providing bumpers at the limits and an interlocking arrangement restricting the vertical movement of the supporting structure to the distance between the discs 27 and 28. In this manner even if the cushioning span should fail to support the supported body there will be an interlocking connection between the supported and supporting structures.

A modification is shown in Fig. 2 in which the embodiment of the invention is adapted for mounting on a plate member 31. A shorter base member 30 may be used because the plate member 31 has an aperture providing sufficient clearance in which the inner member and cushioning body 15 may move when loaded.

Referring to Fig. 4 another modification of the invention is shown in which the outer portion 24 of the cushioning body 15 may be provided with increased gripping action by clamping the material of the cushioning body 15 against the base member 30 with a ring 32 encompassing the cushioning body. The ring 32 may be disposed adjacent the beaded lip 25 of the cushioning body 15 as shown to provide additional gripping action.

In Fig. 5 a further modification is shown in which the thickness of the overlapping outer portion 24 of the cushioning body 15 is substantially the same providing a mounting with a smooth and uniform outer surface.

A still further modification incorporating a cushioning body 33 with a shape as shown in Fig. 6 may be used to advantage in some applications. The cushioning body 33 is molded with the inner diameter of the outer portion tapering from a portion 34 for engaging the edge of a base member to a beaded lip portion 35 of smaller diameter than the outer diameter of the base member. The inner diameter at the portion 34 may be substantially the same as the outer diameter of the base member so that in the mounting the load will urge the portion 34 against the base member 13 in gripping engagement while the tapered construction will provide additional gripping of the base member 13 caused by the tension in the outer portions of the cushioning body which are stretched around the base member.

These and other variations may be made without departing from the scope of the invention as it is defined in the following claims.

We claim:

1. A resilient mounting for connecting supported and supporting structures comprising an annular member for mounting on one of said structures, said annular member having a wall terminating in an annular margin bent directly inwardly from said wall providing a rounded edge seat at said wall, a body of resilient rubber-like material having a central portion for connecting to the other of said structures and a portion extending outwardly therefrom to overlie said inwardly bent margin and rounded edge seat and embrace the outer face of said wall, and a clamping member at the outer surface of said body for urging said body against said annular member.

2. A spring unit comprising a cushioning body of resilient rubber-like material for mounting elastically in gripping relation over the end of an annular support, said body comprising a central portion terminating in an outer margin depending from said central portion providing an inner supporting face on said outer margin, said margin having an inner diameter tapering from a position on said inner supporting face toward the edge of the depending margin, such that the gripping force of said margin against the support is gradually less toward said central portion by virtue of the taper.

3. A resilient mounting for connecting supported and supporting structures comprising an annular member for mounting on one of said structures, said annular member having a wall terminating in an annular margin bent directly inwardly from said wall providing a rounded edge seat at said wall, and a body of resilient rubber-like material having a central portion for connecting to the other of said structures, a portion extending outwardly from said central portion and terminating in a depending outer margin overlying said inwardly bent margin and rounded edge seat and having an inner supporting face for embracing the outer face of a portion of said wall, said depending outer margin in its unstressed condition before mounting having an inner diameter tapering from a position on said inner supporting face toward the edge of said depending margin and said portion of the wall in contact with said inner face of said depending outer margin having a substantially constant outer diameter not less than the largest inner diameter of said depending outer margin of said body before mounting on said wall.

4. A resilient mounting for connecting supporting and supported structures comprising a body of resilient rubber material having a central attaching portion, a spanning portion projecting radially outward from said central attaching portion and an annular skirt portion at the outer margin thereof, an attaching member seated within said body and embraced by said skirt portion and having an end portion bent directly inward of said member presenting a rounded end rim with a diameter not greater than the maximum outer diameter of the embraced portion of said member, said rounded end rim being seated in the juncture of said spanning portion with said skirt portion and continuing inwardly of said member as an internal flange spaced from said central attaching portion and directed away from said spanning portion to provide space for flexing movement of said spanning portion toward said flange and said central attaching portion comprising means extending radially outward therefrom in axially spaced relation to said spanning portion and in axial alignment with said internal flange of said member to cooperate therewith as a movement-limiting stop.

5. A resilient mounting for connecting supporting and supported structures comprising a body of resilient rubber material having a central attaching portion, a spanning portion projecting radially outward from said central attaching portion and an annular skirt portion at the outer margin thereof, an attaching member seated within said body and embraced by said skirt portion and having an end portion bent directly inward of said member presenting a rounded end rim with a diameter not greater than the maximum outer diameter of the embraced portion of said member, said rounded end rim being seated in the juncture of said spanning portion with said skirt portion and continuing inwardly of said member as an internal flange spaced from said central attaching portion and directed away from said spanning portion to provide space for flexing movement of said spanning portion toward said flange and said central attaching portion comprising an annular flange extending radially therefrom in axially spaced relation to said spanning portion and in axial alignment with said internal flange of said member to cooperate therewith as a movement-limiting stop.

6. A resilient mounting for connecting supporting and supported structures comprising a body of resilient rubber material having a central attaching portion, a spanning portion projecting radially outward from said central attaching portion and an annular skirt portion at the outer margin thereof, an attaching member seated within said body and embraced by said skirt portion and having an end portion bent directly inward of said member presenting a rounded end rim with a diameter not greater than the maximum outer diameter of the embraced portion of said member, said rounded end rim being seated in the juncture of said spanning portion with said skirt portion and continuing inwardly of said member as an internal flange spaced from said central attaching portion and directed away from said spanning portion to provide space for flexing movement of said spanning portion toward said flange and said body of resilient rubber material comprising also an annular flange portion of said material surrounding said central attaching portion in axially spaced relation to said spanning portion and in axial alignment with said internal flange of said member to cooperate therewith as a movement-limiting stop.

ROBERT E. DAVIES.
HERBERT H. FINK.

REFERENCES CITED

The following references are of record in the file of this patent:

UNITED STATES PATENTS

| Number | Name | Date |
|---|---|---|
| 2,132,840 | Workman | Oct. 11, 1938 |
| 2,254,783 | Riesing | Sept. 2, 1941 |
| 2,273,869 | Julien | Feb. 24, 1942 |
| 2,422,683 | Kaemmerling | June 24, 1947 |

FOREIGN PATENTS

| Number | Country | Date |
|---|---|---|
| 801,707 | France | May 23, 1936 |